(12) United States Patent
Ouvrier-Buffet et al.

(10) Patent No.: US 7,541,582 B2
(45) Date of Patent: Jun. 2, 2009

(54) METHOD FOR PRODUCTION OF A DEVICE FOR THERMAL DETECTION OF RADIATION COMPRISING AN ACTIVE MICROBOLOMETER AND A PASSIVE MICROBOLOMETER

(75) Inventors: Jean-Louis Ouvrier-Buffet, Sevrier (FR); Laurent Carle, Grenoble (FR); Claire Vialle, Saint-Egreve (FR); Michel Vilain, Saint Georges de Commiers (FR)

(73) Assignees: Commissariat a l'Energie Atomique, Paris (FR); Ulis, Veurey-Voroize (FR)

( * ) Notice: Subject to any disclaimer, the term of this patent is extended or adjusted under 35 U.S.C. 154(b) by 297 days.

(21) Appl. No.: 10/591,579

(22) PCT Filed: Mar. 4, 2005

(86) PCT No.: PCT/FR2005/000518

§ 371 (c)(1),
(2), (4) Date: Sep. 5, 2006

(87) PCT Pub. No.: WO2005/085782

PCT Pub. Date: Sep. 15, 2005

(65) Prior Publication Data

US 2007/0194238 A1   Aug. 23, 2007

(30) Foreign Application Priority Data

Mar. 4, 2004   (FR) .................................. 04 02263

(51) Int. Cl.
*G01J 5/00* (2006.01)
(52) U.S. Cl. .................................. 250/338.1; 250/336.1
(58) Field of Classification Search .............. 250/338.1, 250/336.1
See application file for complete search history.

(56) References Cited

U.S. PATENT DOCUMENTS

| 3,453,432 | A | * | 7/1969 | McHenry | .................. 250/338.3 |
| 5,054,936 | A | * | 10/1991 | Fraden | ....................... 374/164 |
| 5,397,897 | A | | 3/1995 | Komatsu et al. | |
| 5,521,123 | A | | 5/1996 | Komatsu et al. | |
| 6,191,420 | B1 | | 2/2001 | Souma | |
| 2002/0175284 | A1 | | 11/2002 | Vilain | |
| 2007/0262407 | A1 | * | 11/2007 | Schimert et al. | ............ 257/432 |

FOREIGN PATENT DOCUMENTS

| EP | 0 566 156 A1 | 10/1993 |
| EP | 0 892 257 A1 | 1/1999 |
| EP | 1 243 903 A2 | 9/2002 |

* cited by examiner

*Primary Examiner*—Christine Sung
(74) *Attorney, Agent, or Firm*—Oliff & Berridge, PLC

(57) ABSTRACT

The invention relates to a passive microbolometer (12), comprising a reflective screen (17) and a suspended membrane with the function of radiation absorber, thermometer and electrical connection. The membrane is supported by at least two anchor elements (15) fixed to a support substrate (16). The reflective screen (17) may be embodied by at least one layer (18) of metallic material with a thickness of the order of 500 Å to 2000 Å. The screen (17) is arranged beneath the membrane in electrical contact with the membrane absorber element (13) such as to reduce the area resistance of the unit made up of the screen (17) and the absorbing element (13) and to avoid the absorption of radiation by the latter.

4 Claims, 3 Drawing Sheets

METHOD FOR PRODUCTION OF A DEVICE FOR THERMAL DETECTION OF RADIATION COMPRISING AN ACTIVE MICROBOLOMETER AND A PASSIVE MICROBOLOMETER

BACKGROUND OF THE INVENTION

The invention relates to a method for production of a device for thermal detection of radiation comprising at least one active microbolometer and at least one passive microbolometer, each comprising a suspended membrane performing the function of radiation absorber, thermometer and electrical connection, the active and passive microbolometers being formed simultaneously on a single support substrate and a reflective screen being formed on the whole of the device, and then eliminated opposite the locations of the active microbolometers.

The invention also relates to a passive microbolometer produced by such a method.

1. State of the Art

In general manner, a microbolometer with a microbridge comprises a suspended membrane supported by anchoring elements on a support substrate. The membrane presents three functions, i.e. incident radiation absorption by means of an absorbing element, transformation of calories into resistance variation by means of a thermometric element, and electrical connections with the support substrate by means of one or more electrodes.

These three functions can be performed by three separate elements. The absorbing element, which heats due to the effect of an incident radiation, transmits the heat to a thermometric element, the temperature rise of which element is preferably measured electronically by an electronic measuring circuit external to the microbolometer. Electrical connections of the membrane with the support substrate are achieved for example by means of electrodes. The absorbing element is thus designed to convert an incident luminous flux, for example photons, into a heat flux. The heat flux induces a temperature variation of the thermometric element, which converts the temperature variations into electrical signals. The support substrate, above which the membrane is suspended, constitutes the cold point of the microbolometer and contains the electronic measuring circuit that uses the electrical signals.

In certain cases, these three functions can be performed by two elements only. For example, a bolometric material can perform the function both of absorbing element and of thermometric element, electrical connection with the support then being achieved by the electrodes connected to the thermometric element.

In another alternative embodiment, the electrodes can at the same time perform the function both of electrical connection and of absorbing element. The bolometric material then constitutes the thermometric element only.

The electrodes, for example in the form of a coil, can also perform the function both of electrical connection and of thermometric element, the absorbing element being a separate element.

In FIG. 1, the microbolometer 1 comprises a membrane suspended on a support substrate 3 by means of two anchoring elements 4, also forming a thermal link between the membrane and the substrate 3. The membrane comprises at least one absorbing element 2 supporting a thermometric element 5, the temperature variation of which element is measured by means of electrodes (not shown). The support substrate 3 comprises an electronic measuring circuit (not shown) to use the measurement made by the microbolometer 1. The sensitivity of measurement can be improved by introducing insulating arms 6 between the support substrate 3 and the membrane to limit the heat losses of the membrane and to consequently preserve heating thereof.

The thermometric element 5 can be of resistive type. It is then the variation of the resistance and/or of the impedance of the thermometric element 5 that is measured. For example, the thermometric element 5 can be formed by a bolometric material in contact with the electrode(s), which, due to a special configuration, for example in the form of a coil, perform both the role of absorbing element and of electrical connection. An incident radiation absorbed by the microbolometer 1 then causes a temperature increase of the absorber 2, which results in a variation of the electrical resistance of the thermometric element 5. This resistance variation is measured at the terminals of the electrodes, which are preferably securely affixed to the anchoring elements 4.

Efficient operation requires three main conditions to be met as far as the microbolometer 1 is concerned: a low calorific mass, a good thermal insulation of the membrane from the support substrate 3 and a good sensitivity of the conversion effect of the heat rise into an electrical signal. The first two conditions are achieved by implementing thin layers to achieve the microbolometer 1.

FIG. 2 illustrates the reading principle of a microbolometer-based detection device. The device comprises a measuring microbolometer 7, or active microbolometer, that absorbs an incident radiation 8, for example infrared rays. The variation of the resistance of the microbolometer 7 is representative of the value of this radiation. Current reading is frequently used to make this measurement. The current, on output from the microbolometer 7, comprises a variable fraction and an unvarying fraction. The detector in fact operates in relative manner, i.e. it detects a continuous unvarying background signal which may hamper measurement of the useful variable signal, which is in general small compared with this background signal. This unvarying fraction of the current therefore has to be eliminated to obtain optimal measurement of the radiation value.

To increase the reading sensitivity, the unvarying fraction of the current is preferably branched off to a derivation branch so that only the variable part of the current is sent to an integrator 9. In terms of electronics, the element acting as derivation branch must not be too noisy so as not to generate too much disturbance. For this, the derivation branch is achieved by means of a forward-biased resistor of sufficiently high value. A conventional solution consists in using a passive microbolometer as derivation branch, i.e. a microbolometer that does not detect radiation.

The derivation branch therefore comprises, as represented in FIG. 2, a derivation microbolometer 10, which is made blind by a protective screen 11 placed between the radiation 8 and the microbolometer 10. The microbolometer 10 is thus transformed into a passive microbolometer which does not absorb any radiation and acts as reference.

The efficiency of the detection device is therefore also linked to the characteristics of the passive microbolometer 10, which has to be totally blind and advantageously present a minimal heat resistance.

Other detection devices use a bridge arrangement comprising two microbolometers one of which is made passive by fitting a protective screen between the radiation and this microbolometer (EP-A-0892257 and EP-A-0566156).

Placing a protective screen in front of the microbolometer causes problems as far as manufacturing is concerned.

2. Object of the Invention

The object of the invention is to remedy these shortcomings and to achieve a passive microbolometer, manufacture of the protective screen whereof is integrated in the manufacturing process of the passive microbolometer.

According to the invention, this object is achieved by the appended claims and more particularly by the fact that, the membrane comprising a thermometric element and a radiation-absorbing element performing the electrical connections, the passive microbolometer is formed on the reflective screen which comprises at least one metallic layer in contact with the absorbing element of the membrane.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
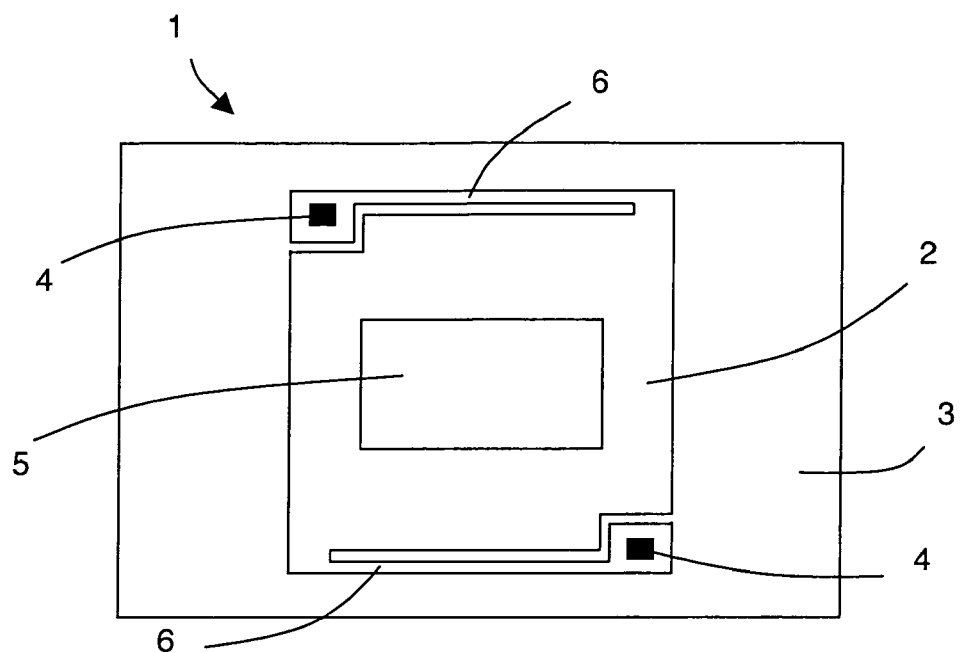
FIG. 1 represents a microbolometer according to the prior art.
Figure 2:
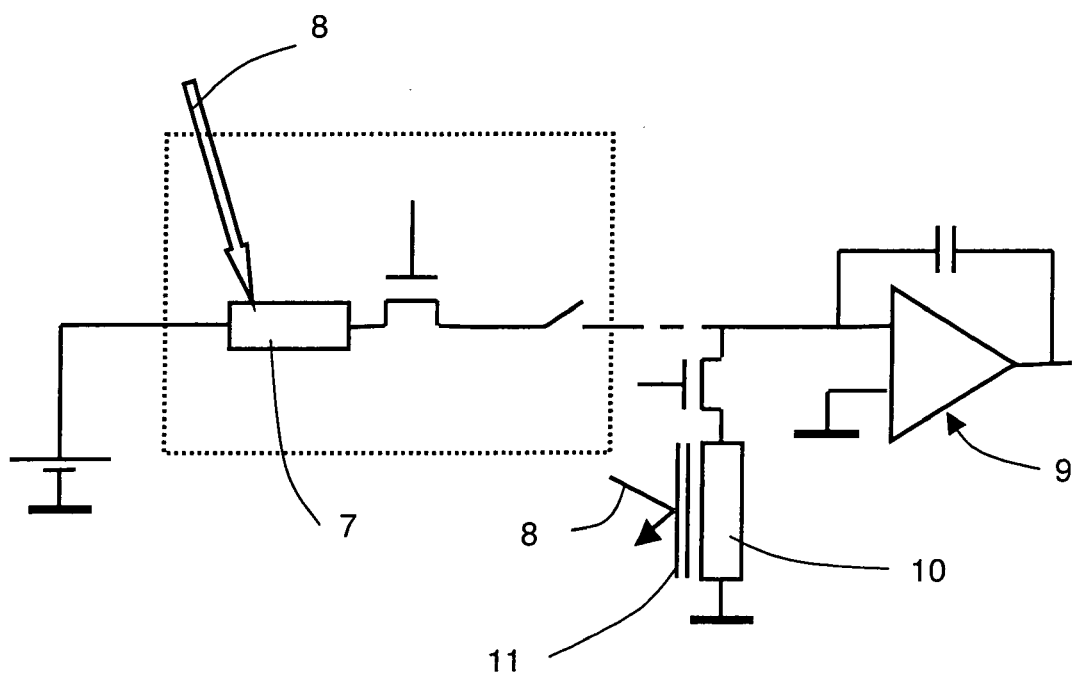
FIG. 2 schematically represents the reading principle of a device for thermal detection of radiation according to the prior art.
Figure 3:
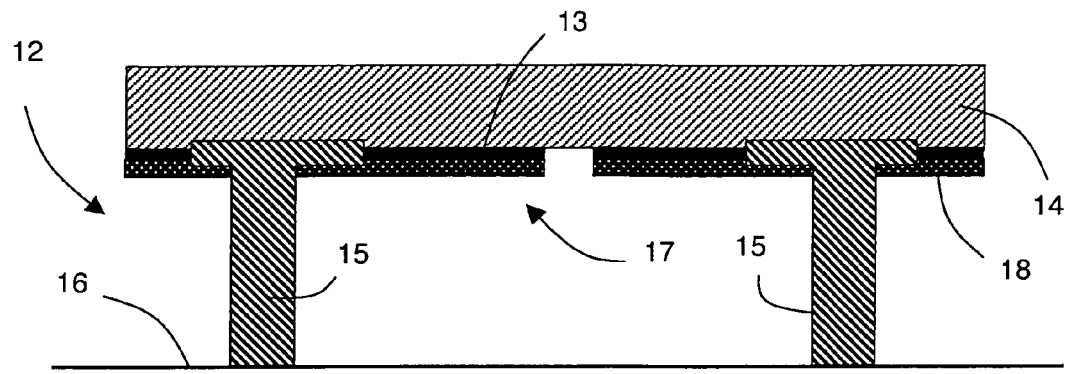
FIG. 3 represents a particular embodiment of a passive microbolometer according to the invention.

In the particular embodiment represented in FIG. 3, the passive microbolometer 12 comprises a suspended membrane with a radiation-absorbing element 13 and a bolometric material constituting the thermometric element 14 of the microbolometer 12. The membrane is supported by two anchoring elements 15 arranged on a support substrate 16.

The passive microbolometer 12 comprises a reflective protective screen 17 formed under the membrane. The protective screen 17 is formed for example by at least one reflecting layer 18, preferably a metallic layer, as metal presents good radiation reflection characteristics, in particular of infrared radiation. The screen 17 must be reflecting to incident radiation and must not short-circuit the thermometric element 14 formed by the bolometric material. The protective screen 17 is therefore in electrical contact with the absorbing element 13 only and the thermometric element 14, formed by the bolometric material, is arranged on the absorbing element 13.

The materials constituting the protective screen 17 are chosen such that the protective screen 17 presents the necessary optical and thermal properties to reflect radiation. The layer 18 is made of metal preferably chosen from aluminium, silver, gold and copper, which have an excellent infrared reflecting capacity and constitute genuine optical mirrors. The thickness of the metallic layer is about 500 Å to 2000 Å.

Other materials can be chosen for the reflecting screen 17. For example, the screen 17 can comprise an intrinsically insulating stack of layers of materials, in particular metals or doped indium and tin oxides.

The screen 17 can also be formed by a reflector of interferential type, i.e. a screen comprising a stack of insulating or conducting thin layers. The screen 17 can also be made from a material with surface or volume texture effect. It can also be made of a cermet material, i.e. a ceramic with metal inserts, with a conduction threshold depending on the metal concentration in the ceramic.

The bolometric material constituting the thermometric element 14 is for example weakly or highly resistive p- or n-type polycrystalline or amorphous silicon. The bolometric material can also be a vanadium oxide elaborated in a semi-conducting phase, a ferrite or a manganite.

The support substrate 16 is a support that is for example silicon-based. It ensures the mechanical strength of the passive microbolometer 12 and preferably comprises devices (not shown) for biasing and reading the resistance of the thermometric element. It can also comprise multiplexing components enabling, notably in the case of a detector comprising several microbolometers with a matrix structure, the signals from the different microbolometers to be serialized and transmitted to a reduced number of outputs to be used by a usual imagery system.

In the particular embodiment of FIG. 3, the sheet resistance $R_\square$ of the absorbing element 13 must be about 300Ω to absorb the radiation. For the sheet resistance of the assembly formed by the absorbing element 13 and the screen 17 to be that of a reflector, i.e. a sheet resistance of about 0.1Ω, the absorbing element 13 must be in electrical contact with the reflecting screen 17. The sheet resistance of the absorbing element 13 is then associated with that of the screen 17.

The incident radiation passes through the bolometric material forming the thermometric element 14, which is transparent in this embodiment, then encounters the assembly formed by the absorbing element 13 and the metal screen 17, which then plays its role of reflecting screen, and then exits. The weakness of the sheet resistance of the assembly 13, 17 prevents the radiation from being absorbed, and consequently prevents the membrane from heating. The thermometric element 14 therefore doesn't heat and its resistance remains unchanged.

In an alternative embodiment, not represented, the electrodes designed to perform electrical connection between the passive microbolometer 12 and the support substrate 16 have special configurations, for example in the form of coils, and at the same time constitute the absorbing element 13.

The material forming the electrodes is chosen for example from titanium, titanium nitride, platinum, aluminium, palladium, nickel, nickel and chromium alloy etc. The thickness of the electrodes is about 0.005 μm to 1 μm.

In another alternative embodiment, not represented, the bolometric material is formed both by the thermometric element 14 and by the electrodes, for example in the form of a coil, and the absorbing element 13 is a separate element.

In all cases, although the reflecting screen 17 is arranged underneath the membrane, the microbolometer 12 thus obtained is passive, as its membrane does not absorb radiation.

A particular embodiment of a device for thermal detection of radiation, comprising at least one active microbolometer 19 and one passive microbolometer 12, according to FIG. 3, produced on a single support substrate 16, will be described in greater detail with regard to FIGS. 4 to 7.

Figure 4:
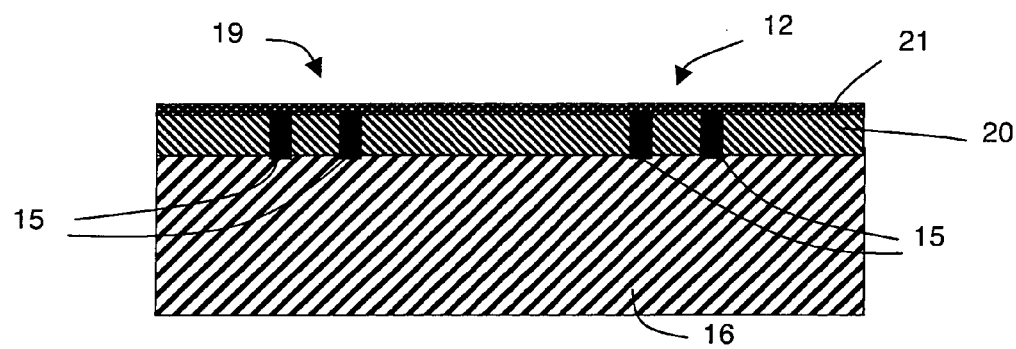
FIGS. 4 to 7 represent different steps of a schematic embodiment of a manufacturing process of a device for thermal detection of radiation comprising a passive microbolometer according to FIG. 3.

In FIG. 4, the method for producing the device first comprises successive depositions, on the support substrate 16 bearing the anchoring elements 15, of a sacrificial layer 20, preferably made of polyimide, of a thickness substantially equal to the thickness of the anchoring elements 15 of the microbolometers 12 and 19, and of a metallic layer 21 constituting the protective screen 17 of the passive microbolometer 12.

Figure 5:
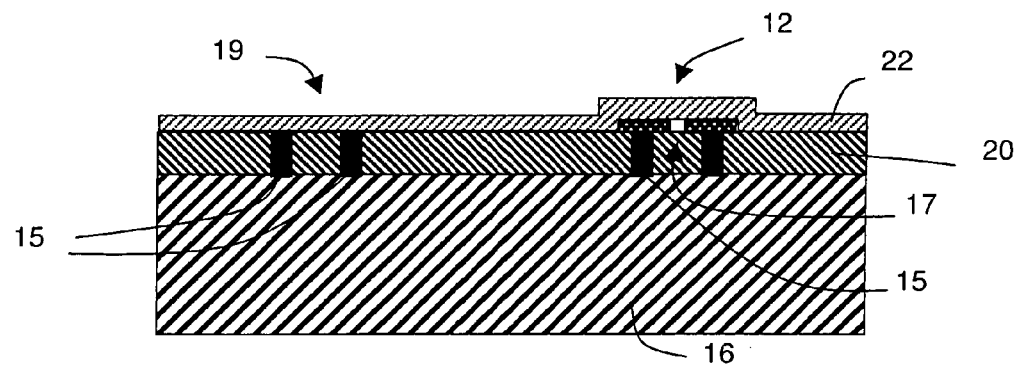

In FIG. 5, etching of the layer 21 constituting the protective screen 17 only opposite the location of the active microbolometer 19 enables a protective screen 17 to be kept at the level of the passive microbolometer 12 only. In the particular embodiment of FIGS. 3 to 7, the reflecting screen 17 is made of conducting material. It is therefore indispensable to provide a dielectric insulation of this layer with respect to the anchoring elements 15. This insulation is generated for example by a break in the reflecting screen 17, achieved by etching, as represented in FIG. 3. Various layers forming the membranes 22 of the microbolometers 12 and 19 are then deposited, on the sacrificial layer 20 and on the protective screen 17, arranged at the level of the passive microbolometer 12.

Figure 6:
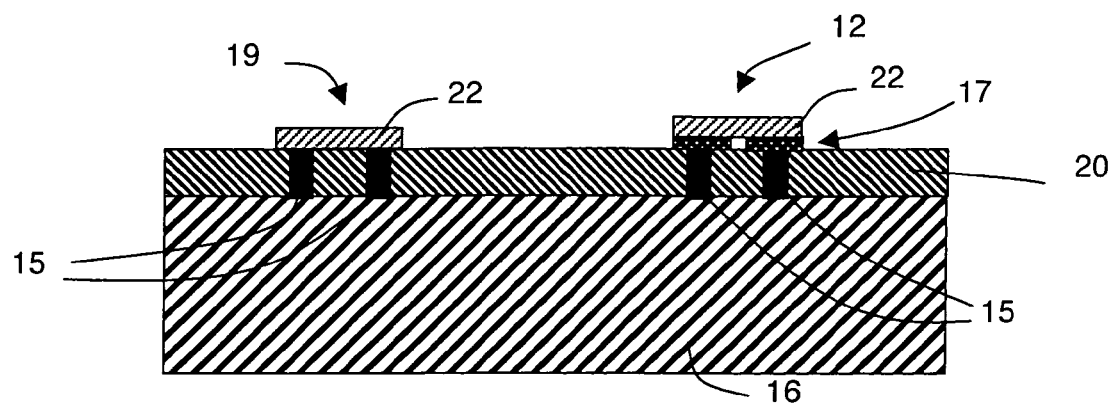
Figure 7:
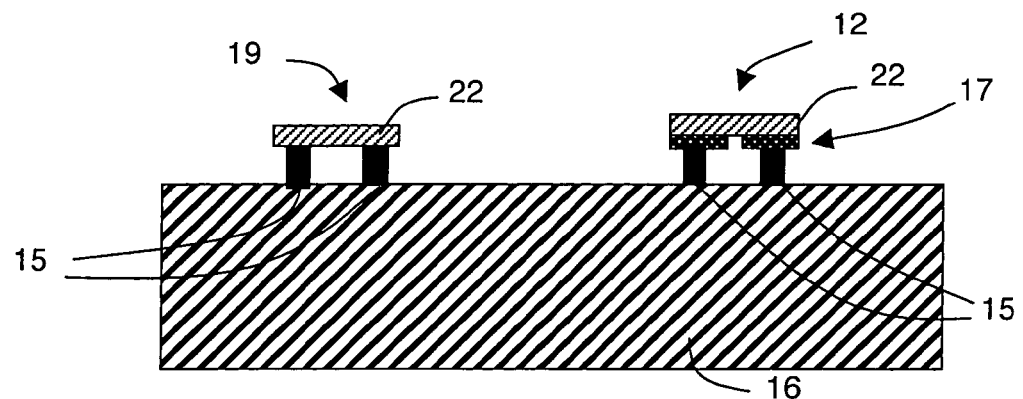

In FIG. 6, etching of the membranes 22 then enables the microbolometers 12 and 19 to be delineated. Finally, etching of the sacrificial layer 20 enables the detector represented in FIG. 7 to be obtained, with the passive microbolometer 12, with an integrated protective screen 17, arranged underneath the membrane 22, and the active microbolometer 19, arranged on the same support substrate 16.

In the method of production described above, the protective screen 17 is delineated for example by chemical or plasma etching processes, or by a lift-off process. In the case of a metal protective screen 17, the metallic layer 18 is deposited for example by cathode sputtering, or by thermal decomposition (LPCVD).

To improve its operation, the passive microbolometer 12 can be thermalized, i.e. its thermal conductance be improved, by doing away with the thermal insulation arms 6, present in particular on the active microbolometer 19.

In all cases, the technology of the microbolometers 12 and 19 is not affected by fitting of the reflecting screen 17, as fabrication of the reflecting screen 17 is integrated in the fabrication process of the microbolometers 12 and 19. This results in a saving of time and especially of cost, as the already known microbolometer production methods and lines do not have to be changed.

Moreover, as the detection device preferably operates in a vacuum, the surface of the protective screen 17 in contact with the radiation does not have to be protected by a special coating.

The invention is not limited to the embodiment described above. The detector can comprise a matrix architecture enabling infrared imagery to be performed. The matrix architecture is composed of a plurality of active microbolometers 19 and a plurality of passive microbolometers 12 arranged regularly in lines and columns on a single support substrate 16. The fabrication methods are the same and the electronic measuring circuit integrated in the support substrate 16 recovers and uses each measurement of the microbolometers 12 and 19 to transform them into an infrared imagery.

The detector can be encapsulated in a vacuum or in a gas that is a very low heat conductor, to gain performance. The enclosure in which the detector is encapsulated then comprises a window transparent to radiation.

The microbolometers 12, 19 of the detection device can comprise any type of thermometric element, for example a thermistor, an electrode, a diode, etc.

The invention claimed is:

1. A device for detection of thermal radiation comprising:
at least one active microbolometer and at least one passive microbolometer formed simultaneously on a single support substrate, each comprising:
a suspended membrane performing the function of radiation absorber, thermometer and electrical connection, the membrane comprising a thermometric element and a radiation-absorbing element performing the electrical connection;
a reflective screen being formed on the substrate except at locations corresponding to the active microbolometers, the passive microbolometer being formed on the reflective screen which comprises at least one metallic layer in contact with the absorbing element of the membrane, the reflective screen being arranged underneath the membrane, in contact with the absorbing element of the membrane.

2. The device according to claim 1, wherein the thickness of the metallic layer is about 500 Å to 2000 Å.

3. A method for production of a device for detection of thermal radiation comprising:
at least one active microbolometer and at least one passive microbolometer, each comprising a suspended membrane performing the function of radiation absorber, thermometer and electrical connection, the membrane comprising a thermometric element and a radiation-absorbing element performing the electrical connection, the active and passive microbolometers being formed simultaneously on a single support substrate;
a reflective screen being formed on the whole of the device, and then eliminated opposite the locations of the active microbolometers, the passive microbolometer formed on the reflective screen which comprises at least one metallic layer in contact with the absorbing element of the membrane, the reflective screen being arranged underneath the membrane, in contact with the absorbing element of the membrane.

4. A method for production of a device for detection of thermal radiation according to claim 3, wherein the reflective screen is arranged directly underneath the membrane and in direct contact with the absorbing element of the membrane.

* * * * *